(12) United States Patent
Otsuka (10) Patent No.: US 6,970,308 B2
(45) Date of Patent: Nov. 29, 2005

(54) MEDICAL APPARATUS

(75) Inventor: Satoshi Otsuka, Mitaka (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 10/723,224

(22) Filed: Nov. 26, 2003

(65) Prior Publication Data

US 2004/0109064 A1 Jun. 10, 2004

(30) Foreign Application Priority Data

Nov. 28, 2002 (JP) .............................. 2002-345771

(51) Int. Cl.[7] .............................. G02B 7/02; A61B 1/06
(52) U.S. Cl. ...................... 359/819; 600/160; 600/137; 600/130
(58) Field of Search ................................ 359/819, 822, 359/823; 600/101, 102, 130, 137, 160, 167, 600/168

(56) References Cited

U.S. PATENT DOCUMENTS

| | | | | |
|---|---|---|---|---|
| 5,745,165 A | * | 4/1998 | Atsuta et al. | 348/65 |
| 5,815,640 A | | 9/1998 | Wang et al. | 700/251 |
| 5,876,327 A | * | 3/1999 | Tsuyuki et al. | 600/112 |
| 6,293,910 B1 | * | 9/2001 | Yamakita et al. | 600/132 |
| 6,524,235 B2 | * | 2/2003 | Mitsumori | 600/167 |

FOREIGN PATENT DOCUMENTS

| | | |
|---|---|---|
| JP | 7-227398 | 8/1995 |
| JP | 8-254472 | 10/1996 |

* cited by examiner

Primary Examiner—Ricky Mack
(74) Attorney, Agent, or Firm—Scully, Scott, Murphy & Presser (57) ABSTRACT

A lens holding unit that holds an objective lens on which a luminous flux from a subject is landed and an image-pickup element holding unit that holds an image-pickup element capable of picking up an optical image are connected to each other for elastic deformation and restoration. External force that acts on the lens holding unit serves to change the position of the optical axis of an optical image that is formed on the image-pickup surface of the image-pickup element.

20 Claims, 6 Drawing Sheets

FIG. 16

MEDICAL APPARATUS

CROSS-REFERENCE TO RELATED APPLICATIONS

This application is based upon and claims the benefit of priority from the prior Japanese Patent Application No. 2002-345771, filed Nov. 28, 2002, the entire contents of which are incorporated herein by reference.

BACKGROUND OF THE INVENTION

1. Field of the Invention

The present invention relates to a medical apparatus designed so that an image of a luminous flux from a subject incident on an objective lens is formed on image-pickup means by means of an imaging lens and an image of the subject is picked up by means of the image-pickup means.

2. Description of the Related Art

Modern surgical operations are frequently performed under endoscopic observation. In many cases, rigid endoscopes are used in endoscopic operations. A rigid endoscope has an insertional section substantially in the form of a cylinder. An observation optical system is incorporated in the insertional section, and an image-pickup optical system is located in the proximal end portion of the insertional section. In performing an endoscopic operation, an operator directly holds and manipulates the rigid endoscope, and inserts the insertional section into a body cavity through an orifice in a patient's body surface region. Then, the operator directs an objective lens (one-way screen) of the observation optical system toward an operative region of the subject and observes the operative region through the lens. If any body tissue interferes with the inserted insertional section as the operator directly manipulates the rigid endoscope, the operator can recognize the interference by a feeling in his/her hand that holds the endoscope.

In some cases, moreover, the posture for the endoscopic observation is continuously maintained by fixedly supporting the endoscope by means of a holding apparatus, such as a stand. In general, the endoscope holding apparatus of this type is composed of a plurality of joints that can be shifted alternatively between a fixed state and a rockable state. When the joints are in the rockable state, the operator can freely change the posture of the endoscope. When the joints are in the fixed state, on the other hand, the operator can fixedly support the endoscope in that posture. Typical endoscope holding apparatuses are described in Jpn. Pat. Appln. KOKAI Publication No. 7-227398 and U.S. Pat. No. 5,815,640. Proposed in Jpn. Pat. Appln. KOKAI Publication No. 8-254472, moreover, is an endoscope that is provided with a pressure sensor for detecting external force that acts on its insertional section.

BRIEF SUMMARY OF THE INVENTION

A medical apparatus according to an aspect of the invention comprises: an objective lens having an optical axis, onto which a luminous flux from a subject is incident; a lens holding unit which holds the objective lens; an image-pickup element which picks up an optical image formed by the objective lens, the image-pickup element having an image-pickup surface; n image-pickup element holding unit which holds the image-pickup element; and coupling unit which connects the lens holding unit and the image-pickup element holding unit so that the position of the optical axis of the optical image is changed relative to the image-pickup surface of the image-pickup element.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figures 1, 2, 3:
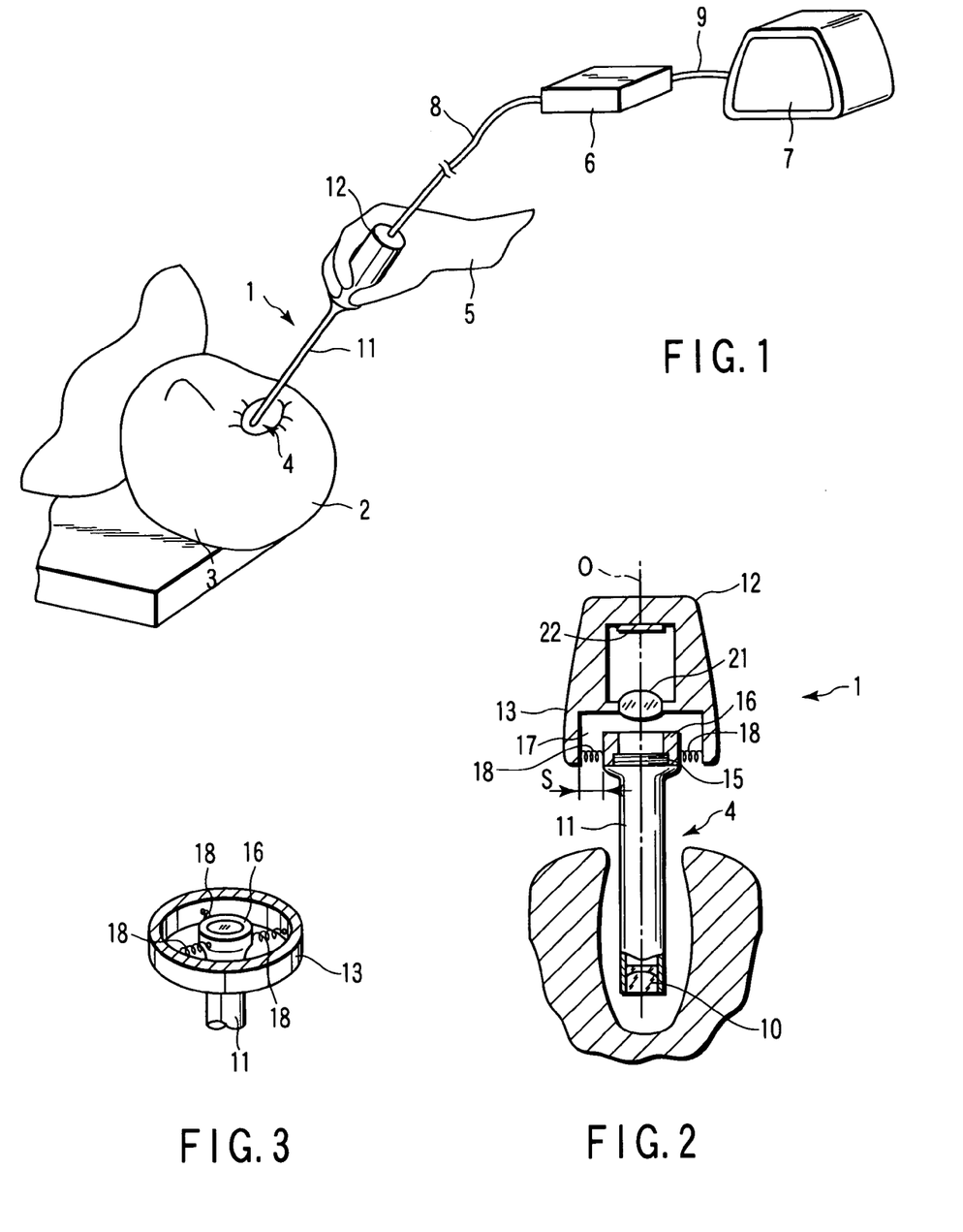
FIG. 1 is a schematic view illustrating the way of use of the system of a medical apparatus according to a first embodiment of the invention.
FIG. 2 is a partial vertical sectional view of the medical apparatus of the first embodiment in an operating state.
FIG. 3 is a cross-sectional view of a coupling unit of the medical apparatus of the first embodiment.

A medical apparatus according to a first embodiment of the present invention will now be described with reference to FIGS. 1 to 4. FIG. 1 is a schematic view illustrating the way of use of an endoscope 1. As shown in FIG. 1, a patient 2 is laid on a surgical bed 3. A bar hole 4 is bored in the head of the patient 2 by surgical incision. As an operator observes the interior of the bar hole 4 through the endoscope 1, he/she grasps the handgrip portion of the endoscope 1 in a hand 5 and inserts an insertional section of the endoscope 1 into the bar hole 4, as shown in FIG. 1.

A CCD of an image-pickup apparatus (mentioned later) is connected to a monitor 7 through a controller 6 for use as an image processor. The monitor 7 displays an endoscopic image that is picked up by means of the image-pickup apparatus. The endoscope 1 and the controller 6 are connected to the controller 6 and the monitor 7 by means of flexible cables 8 and 9, respectively.

The configuration of the endoscope 1 will now be described specifically with reference to FIG. 2. The endoscope 1 is provided with a rigid insertional section or an optical tube 11. The insertional section constitutes a first housing as a holding unit (or holding frame) that holds an objective lens 10. A lens group or element (not shown) that includes the objective lens 10 is located in the optical tube 11. This lens group (relay lenses) transmits an image (incident luminous flux) obtained from a subject to the proximal end side by means of the objective lens 10 that is provided on the distal end of the optical tube 11, and emits an afocal luminous flux in the direction of the optical axis from the proximal end portion of the optical tube 11. Thus, the lens group constitutes an objective optical system.

As shown in FIG. 2, a housing 12 that doubles as a grip section for gripping the endoscope 1 is coupled to the proximal end of the optical tube 11. The housing 12 serves as a holding unit (or holding frame) that holds an image-pickup element (mentioned later) and constitutes a second housing. As shown in FIG. 1, the outer surface portion of the housing 12 has a shape such that it can be held directly in the operator's hand 5. The outer surface portion forms a grip section 13 by which the operator's hand 5 holds the endoscope 1.

As shown in FIG. 2, an external thread portion 15 is formed on the outer periphery of the proximal end portion of the optical tube 11. The thread portion 15 mates with an internal thread portion that is formed on the inner surface of a ring-shaped adapter 16. By this connecting means, the optical tube 11 is removably fixed to the adapter 16. The adapter 16 may be also regarded as a part of a housing on the side of the optical tube 11.

As shown in FIG. 2, the gripping housing 12 has a substantially cylinder shape as a whole. The housing 12 is in the form of a cylinder of which one end portion on the side of the optical tube 11 has a greater inside diameter. As shown in FIG. 3, three coil springs 18 are arranged radially at equal angular intervals in an internal space 17 of the cylinder. In this embodiment, an elastic coupler includes the grip section 13, the ring adaptor 16 and the springs 18 as member of an elastic coupling means. The optical tube 11 constitutes another housing for supporting the objective lens. The optical tube 11 and the housing 12 are connected to each other by an elastic coupler. The coil springs 18 are members that connect the holding unit that holds the objective lens 10 and the holding unit that holds the image-pickup element. The springs 18 couple the two holding units for relative movement.

As shown in FIG. 3, each coil spring 18 is formed of a metallic extension spring, for example. The inner end of each spring 18 is attached to the outer periphery of the adapter 16, and the outer end to the inner wall surface of the cylinder of the housing 12. The coil springs 18 connect the housing 12 and the adapter 16 and can be elastically deformed in a manner such that they extend and contract depending on external force that acts on the optical tube 11. The optical tube 11 and the housing 12, for use as the first and second housings, respectively, are pulled by the respective tensile forces of the coil springs 18 as their coupling means as they are supported. When no external force acts on the optical tube 11, the two holding units maintain their coaxial relation, as shown in FIG. 2, so that the tensile forces act equally on them. Each coil spring 18 is situated in a region that adjoins a range in the middle of the optical path of the afocal luminous flux that is emitted from the optical tube 11.

As shown in FIG. 2, an imaging lens 21 of an imaging optical system and a CCD (charge-coupled device) 22 for use as image-pickup means are arranged in the housing 12. The housing 12 is a member that holds the imaging lens 21 and the image-pickup means. The imaging lens 21 is situated on a central axis 0 of the housing 12 that is in line with the original image-pickup optical axis. The lens 21 forms an image in the position of the image-pickup surface of the CCD 22, and the formed image is picked up by means of the CCD 22.

The natural length L of each coil spring 18 is shorter than the length S of the gap between the housing 12 and the adapter 16 (S>L). Therefore, the coil springs 18 are not liable to slacken. Normally, every coil spring 18 is tensioned as it elastically supports the adapter 16 on the housing 12. Normally, the housing 12 and the adapter 16 are connected to each other so that the objective lens 10 of the optical tube 11 and the imaging lens 21 of the housing 12 are coupled optically to each other.

Figure 4:
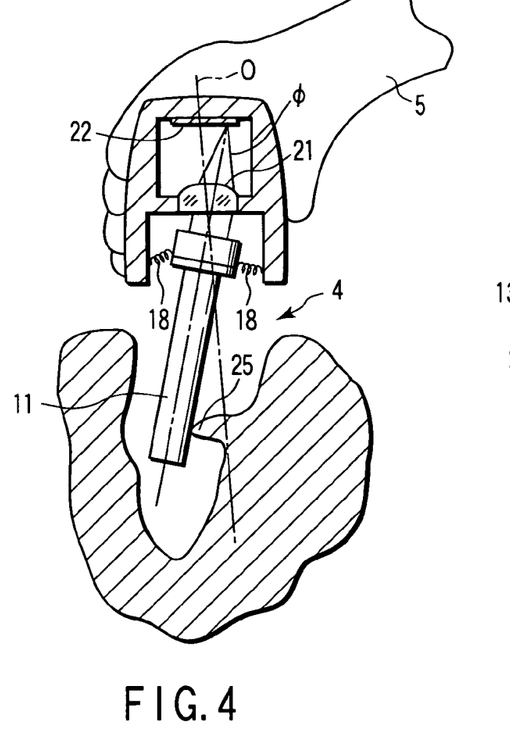
FIG. 4 is a partial vertical sectional view of the medical apparatus of the first embodiment in an operating state.

The following is a description of the function of the medical apparatus constructed in this manner. In operating the endoscope 1, the operator grasps the grip section 13 of the housing 12 in the hand 5 and inserts the optical tube 11 into the bar hole 4 in the head of the patient 2. If an obstacle 25, such as a bone, touches the optical tube 11 as this is done, as shown in FIG. 4, for example, the tube 11 is subjected to external reaction force from the obstacle 25. In consequence, the coil springs 18 are individually elastically deformed depending on the way of receiving the external force.

If each coil spring 18 is deformed, an afocal luminous flux Φ that is emitted from the optical tube 11 inclines at an angle to the central axis 0 of the housing 12, as shown in FIG. 4. Since the afocal luminous flux Φ inclines in this manner, the position of the image that is formed on the image-pickup surface of the CCD 22 by means of the imaging lens 21 changes, so that the optical axis of the optical image moves on the image-pickup surface. Thus, the optical axis of the optical image that is picked up on the image-pickup surface of the CCD 22 moves on the image-pickup surface, depending on the inclination of the optical tube 11. Accordingly, the endoscopic image that is displayed on the monitor 7 moves corresponding to the inclination of the luminous flux Φ.

While inserting the endoscope 1, therefore, the operator continually watches the image on the monitor 7. If the endoscopic image moves so that the picture changes, the operator can recognize external interference with the optical tube 11. The way the external force from the bone or some other obstacle 25 is received varies depending on the way the obstacle 25 touches the optical tube 11, and the endoscopic image moves in different manners. Thus, the operator can easily notice the state of contact by the movement of the image.

According to this arrangement, the operator can recognize the application of external force to the optical tube 11 of the endoscope 1 without depending on a feeling in his/her hand.

Thus, operations can be carried out easily and quickly with security, and fatigue can be eased. Further, even a very thin endoscope can be positively prevented from being deformed or broken by interference with a bone or the like. In consequence, there is no need of complicated operations for interrupting surgical operations and replacing the endoscope. The optical tube 11 of the present invention can be easily constructed though it resembles a conventional one. Further, it can be added to a conventional one without complicating the construction.

Figure 5:
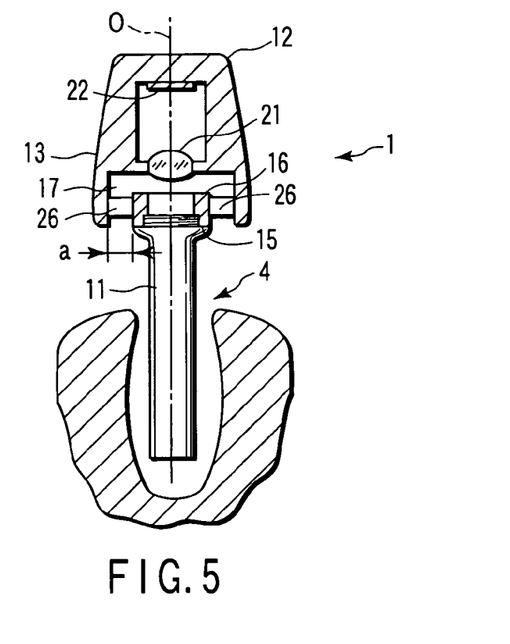
FIG. 5 is a partial vertical sectional view of a medical apparatus according to a modification of the first embodiment in an operating state.
Figure 6:
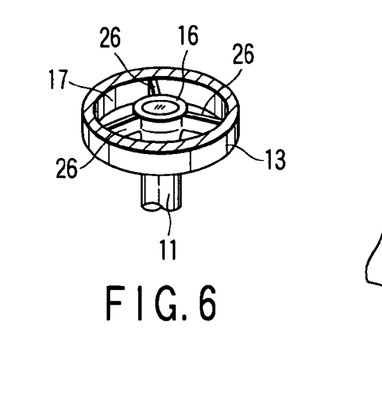
FIG. 6 is a cross-sectional view of a coupling unit of the medical apparatus of the modification of the first embodiment.

Although the coil springs 18 are used as the elastic members that constitute the elastic coupling means according to the first embodiment described above, the invention is not limited to this application. As shown in FIGS. 5 and 6, for example, the coil springs 18 may be replaced with elastic members 26 that are in the form of a bar or prism of rubber, elastomer, or other material each. Each bar-shaped elastic member 26 is not limited to the prism-shaped one, and may alternatively be in the form of a circular column or a structure of any other shape.

A medical apparatus according to a second embodiment of the invention will now be described with reference to FIGS. 7 to 10. Like reference numerals are used to designate common portions of the first and second embodiments, and a detailed description of those portions is omitted.

Figure 7:
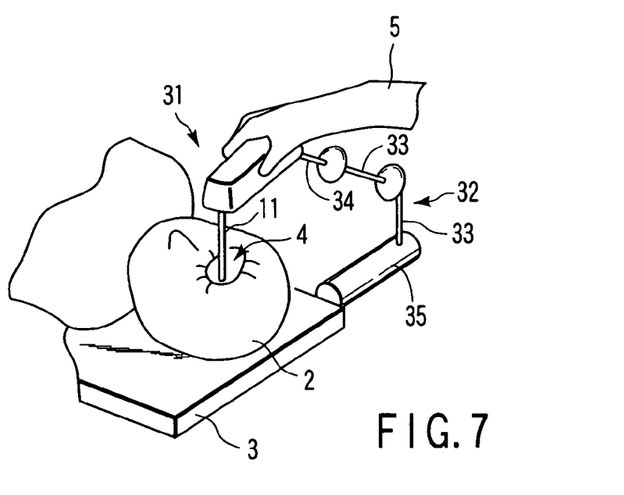
FIG. 7 is a view illustrating the way of use of a medical apparatus according to a second embodiment of the invention.

FIG. 7 is a schematic view illustrating the way of use of an endoscope 31. The endoscope 31 is supported by an endoscope holding apparatus 32, such as the one described in Jpn. Pat. Appln. KOKAI Publication No. 7-227398, for example. The holding apparatus 32 is composed of a plurality of joints 33 that are coupled to one another. The joints 33 are designed so that they can be shifted alternatively between a fixed state and a rockable state. The leading joint 33 is provided with a connecting portion 34 for holding the endoscope 31. A proximal portion 35 of the endoscope holding apparatus 32 is mounted on the surgical bed 3.

The configuration of the endoscope 31 will now be described with reference to FIG. 8. In the endoscope 31, an adapter 36 for use as an objective-side housing is coupled to an optical tube 11 for use as an insertional section. A thread portion 15 is formed on the outer periphery of the proximal end portion of the optical tube 11. The adapter 36 is removably attached to the optical tube 11 with its ring-shaped portion screwed on the thread portion 15.

The adapter 36 is provided with an objective lens 37a, which is linked to an objective optical system of the optical tube 11, and a prism 37b for use as a reflective member. The objective lens 37a and the prism 37b constitute a relay optical system 37. The relay optical system 37 converges an afocal luminous flux emitted from the optical tube 11 and bends and transmits it to an imaging optical system of a housing 12.

The adapter 36 is fitted with the objective lens 37a and the prism 37b as elements that constitute the relay optical system 37. The prism 37b is located between the objective lens 37a and a lens 38 of the imaging optical system and on the optical axis of the relay optical system 37.

The adapter 36 that holds the optical tube 11 is coupled to a housing 41 for use as an image-pickup element holding unit by means of elastic members (mentioned later). The housing 41 is coupled to the adapter 36 of the optical tube 11 by means of three coil springs 18 for use as elastic members of elastic coupling means. All the three coil springs 18 are pressurized, and elastically connects the adapter 36 as a lens holding unit and the housing 41 as the image-pickup element holding unit for movement. Normally, the respective tensile forces of the three springs 18 are balanced and hold the optical tube 11 in a balanced position. The elastic coupling means constructed in this manner is set corresponding to a position in the middle of the optical path of the relay optical system 37 that converges the afocal luminous flux emitted from the optical tube 11.

In this embodiment, an elastic coupler includes the adaptor 36, the housing 41 and the springs 18 as member of an elastic coupling means.

Located in the housing 41 is an optical system that receives the luminous flux bent by means of the prism 37b. This optical system comprises the lens 38 of the imaging optical system, a focusing optical system 42, zooming optical system 43, and imaging optical system 44, which are arranged in the order of reception of the luminous flux that is bent by means of the prism 37b. A CCD 45 for use as an image-pickup element is located in the housing 41. It has an image-pickup surface on the focal plane of the imaging optical system 44.

Figure 8:
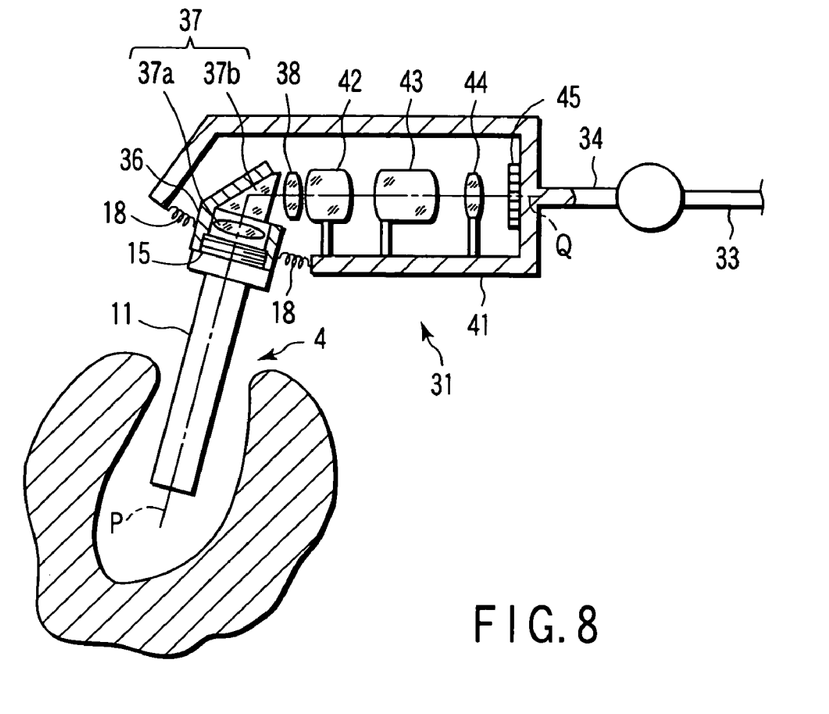
FIG. 8 is a partial vertical sectional view of the medical apparatus of the second embodiment in an operating state.

As shown in FIG. 8, the prism 37b held in the adapter 36 changes the direction of an observation optical axis P of the optical tube 11 toward an optical axis Q of the optical system in the housing 41. Normally, the incident luminous flux is in line with the optical axis Q.

The CCD 45, like the one according to the first embodiment, is connected to a controller 6, as an image processor, and a monitor 7 by means of cables.

The function of the endoscope 31 will now be described with reference to FIGS. 9 and 10. In the description to follow, external forces are supposed to act on the optical tube 11 in two directions, a Z-direction substantially parallel to the axis P and an X-direction substantially perpendicular to the axis P.

Figure 9:
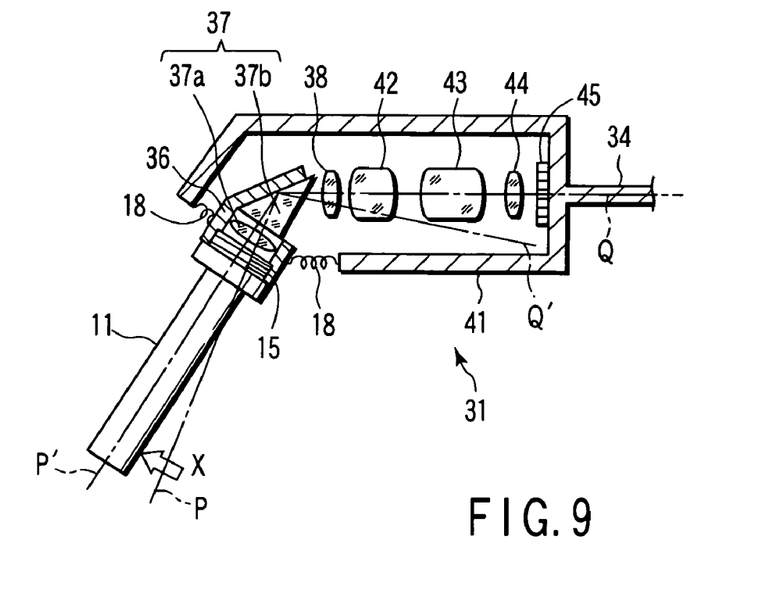
FIG. 9 is a partial vertical sectional view of the medical apparatus of the second embodiment in the operation state.

The following is a description of a first case in which an X-direction external force is applied to the optical tube 11, as shown in FIG. 9. Since the optical tube 11 is integral with the adapter 36, the coil springs 18 are subjected to its external force and are elastically deformed in accordance with the external force. The optical tube 11 and the adapter 36 are inclined depending on the applied external force and the spring characteristic of the coil springs 18. Further, the observation optical axis P of the optical tube 11 moves to a position indicated by P' in FIG. 9. As this is done, the optical axis of the luminous flux emitted from the prism 37b inclines to Q'. The optical axis of an optical image that is picked up by means of the CCD 45 moves on the image-pickup surface, depending on external force on the optical tube 11. As this is done, an endoscopic image displayed on the monitor 7 also moves. While inserting the endoscope 31, the operator continually watches the monitor 7, thereby viewing the movement of the endoscopic image. By doing this, the operator can recognize external X-direction interference with the optical tube 11.

Figure 10:
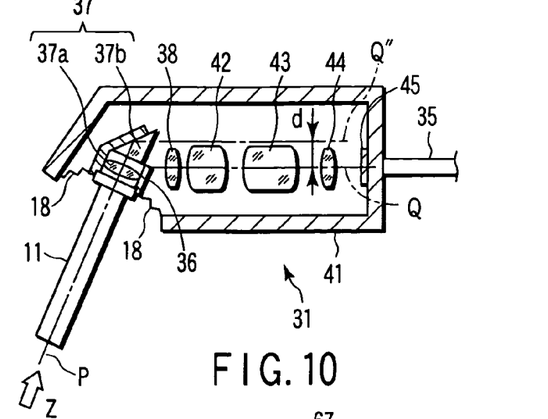
FIG. 10 is a partial vertical sectional view of the medical apparatus of the second embodiment in another operation state.

The following is a description of a second case in which a Z-direction force is applied to the optical tube 11, as shown in FIG. 10. Since the optical tube 11 is connected integrally with the adapter 36, the coil springs 18 are deformed in accordance with the external force on the observation optical axis P in the same manner as aforesaid. Depending on the external force and the spring characteristic of the coil springs 18, moreover, the optical tube 11 and the adapter 36 move in the direction of the observation optical axis P to the position shown in FIG. 10. Thereupon, the position of the axis P of the optical tube 11 is not changed, and an optical axis Q" of a luminous flux emitted from the prism 37b is kept parallel to the optical axis Q as it is displaced sideways. Based on this displacement of the optical axis Q", the optical axis of the optical image that is picked up by means of the CCD 45 moves on the image-pickup surface for a distance "d" between the optical axes Q and Q", so that the endoscopic image displayed on the monitor 7 also moves. While inserting the endoscope 31, therefore, the operator watches the monitor 7, thereby viewing the movement of the endoscopic image. By doing this, the operator can recognize external Z-direction interference with the optical tube 11.

This arrangement has a specific effect that the operator can recognize the axial (Z-direction) interference with the optical tube 11 as he/she inserts the endoscope 31 into an operative region, besides the effects of the first embodiment. Thus, the operator can respond to any of X- and Y-direction vector components of the external force that acts on the optical tube 11, and therefore, detect external forces that act in different directions as well as the external force in one direction.

A medical apparatus according to a third embodiment of the invention will now be described with reference to FIGS. 11 to 13. Like reference numerals are used to designate common portions of the first to third embodiments, and a detailed description of those portions is omitted.

An external thread portion 15 is formed on the outer periphery of the proximal end portion of an optical tube 11. An adapter 51 for use as a first housing is screwed on the thread portion 15. The adapter 51 has a spherical external shape. The adapter 51 has a through hole 52 extending along an axis that covers its center. An internal thread 53 that mates with the thread portion 15 of the optical tube 11 is formed on one end portion of the through hole 52. The optical tube 11 and the adapter 51 can be removably coupled to each other by joining the thread portion 15 and the internal thread 53 together. An objective lens 54 of an objective optical system is disposed in the through hole 52 of the adapter 51. The lens 54 is coaxial with the optical axis P of the objective optical system of the optical tube 11.

Further, the adapter 51 is rotatably supported in a seat 55. The seat 55 is formed having a through hole 56. The inner peripheral surface of the hole 56 is spherical, and an outer peripheral surface 57 of the spherical part of the adapter 51 engages the inner peripheral surface of the through hole 56, whereby the adapter 51 is coupled concentrically. The spherical part of the adapter 51 and the seat 55 that supports it constitute a guide device that restrains relative movement of the optical tube 11 and the housing 41. The optical tube 11 and the housing 41 can rotate around the center point of the sphere of the adapter 51.

Furthermore, the adapter 51 and the seat 55 are provided with an extension spring 61a (other extension springs 61b and 61c are not shown) that resembles the three coil springs 18 as the elastic members according to the first embodiment. The extension springs 61a, 61b and 61c, like the ones shown 3, are arranged substantially radially at equal angular intervals. Like the coil springs 18, the three springs 61a, 61b and 61c are located in a gap formed between the adapter 51 and the seat 55, and connect the adapter 51 and the seat 55 under uniform pilot pressure. The springs 61a, 61b and 61c are arranged at right angles to the central axis of the through hole 52 and situated equally on an axis that is substantially in line with the center of the sphere of the adapter 51.

Figure 12:
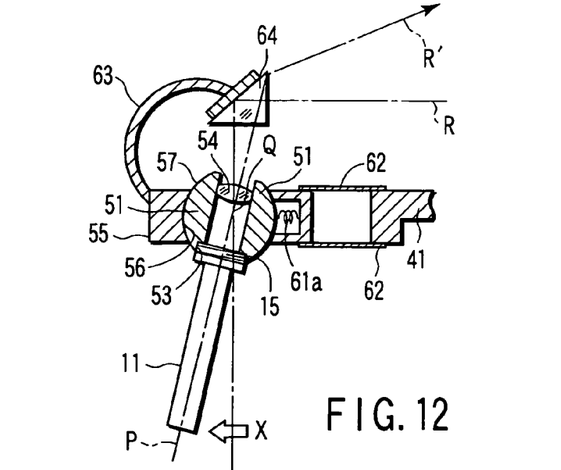
FIG. 12 is a partial vertical sectional view of the medical apparatus of the third embodiment in an operating state.

As shown in FIG. 12, the seat 55 is supported on the housing 41 by means of a pair of parallel plate springs (elastic bodies) 62 that are arranged vertically. One end portion of each leaf spring 62 is attached to the housing 41, and the other end portion to the seat 55.

In this embodiment, an elastic coupler includes the adaptor 51, the seat 55, the springs 61a, 61b and 61c, the housing 41 and the least springs 62 as member of an elastic coupling means.

Figure 11:
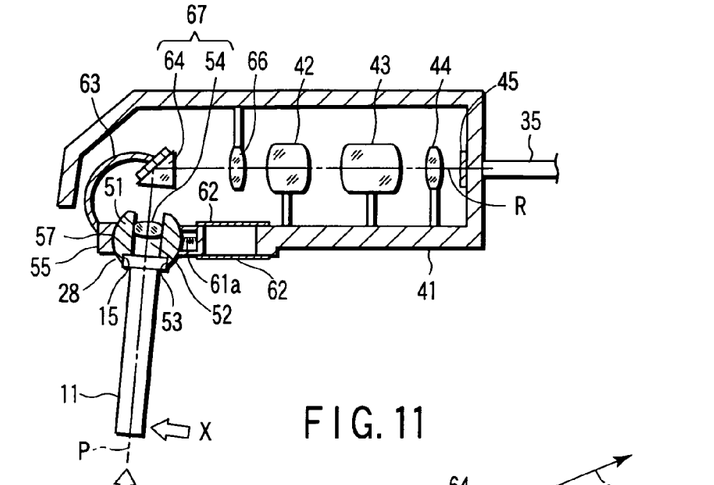
FIG. 11 is a partial vertical sectional view showing a medical apparatus according to a third embodiment of the invention.

In a normal standby state, as shown in FIG. 11, the parallel plate springs 62 are arranged so that the normal direction of the spring plate surface is parallel to the central axis (optical axis) of the optical tube 11. If no external force acts on the optical tube 11, therefore, the respective mounting directions of the axis P of the optical tube 11 and an axis R of the housing 12 are kept at about 90° to each other, as shown in FIG. 11. In the present embodiment, the seat 55 and the parallel plate springs 62 constitute a coupling unit that connects the adapter 51 and the housing 41 for movement.

Further, a boom 63 is coupled to the seat 55. A prism 64 for use as a reflective member is attached to the boom 63. The prism 64 is fixed to the seat 55 by means of the boom 63.

As shown in FIG. 11, the objective lens 54 and the prism 64 constitute a relay optical system 67 that guides an afocal luminous flux emitted from the optical tube 11 to a lens 66 in the incidence-side optical path of a focusing optical system 42. The relay optical system 67 is so that the luminous flux can be bent by means of the prism 64 that is interposed between the objective lens 54 and the lens 66. The prism 64 is located so that a luminous flux that passes along the central axis of the through hole 52 of the adapter 51 is reflected parallel to the direction of optical axis R that is defined by the lens 66, focusing optical system 42, zooming optical system 43, and imaging optical system 44.

The function of the medical apparatus according to the third embodiment will now be described with reference to FIGS. 12 and 13. In the description to follow, external forces are supposed to act on the optical tube 11 in two directions, the X-direction substantially perpendicular to the axis P and the Z-direction substantially perpendicular to the axis P.

If the X-direction external force is first applied to the optical tube 11, as shown in FIG. 12, the adapter 51 rocks in the direction of the given external force X around the center point of the spherical outer peripheral configuration of the adapter 51. As this is done, the spherical outer peripheral part of the adapter 51 and the spherical part of the seat 55 slide on each other.

Then, the adapter 51 stays in a balanced position or the position shown in FIG. 12, which is settled depending on the relation between the respective spring forces of the extension springs 61a, 61b and 61c and the external force applied to the optical tube 11. Since the external force acts in the X-direction, the luminous flux emitted from the prism 64 has an oblique optical axis R', and the optical axis of an optical image that is picked up by means of a CCD 45 moves on an image-pickup surface. Accordingly, the endoscopic image that is displayed on the monitor 7 also moves. While inserting the optical tube 11, the operator continually watches the endoscopic image on the screen of the monitor 7. Based on the movement of the image on the monitor screen, the operator can recognize external X-direction interference with the optical tube 11. Since the parallel plate springs 62 can be deformed only in the direction perpendicular to their flat surfaces, they are not deformed in the X-direction in this case.

Figure 13:
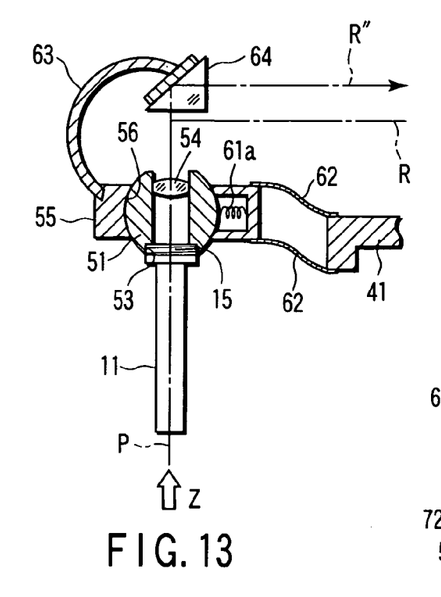
FIG. 13 is a vertical sectional view of the medical apparatus of the third embodiment in the operation state.

If the Z-direction external force is then applied to the optical tube 11, as shown in FIG. 13, the parallel plate springs 62 are deformed, thereby moving the adapter 51 in the Z-direction. In consequence, the optical axis R translates to an optical axis R". The optical axis of the optical image that is picked up by means of the CCD 45 moves on the image-pickup surface in accordance with the Z-direction external force that acts on the optical tube 11. As this is done, the endoscopic image that is displayed on the screen of the monitor 7 also moves on the screen. While inserting the optical tube 11, the operator watches the screen of the monitor 7. Based on the movement of the endoscopic image on the screen, the operator can recognize external Z-direction interference with the optical tube 11. In this case, the adapter 51 and the seat 55 make no relative motion.

As described above, the operator can respond to any of X- and Y-direction vector components of the external force that acts on the optical tube 11, and therefore, detect external forces that act in different directions as well as the external force in one direction.

According to this embodiment, the respective directions of the external forces are subjected to vector resolution so that their corresponding spring forces and elasticity moduli can be set more finely according to application.

Figure 14:
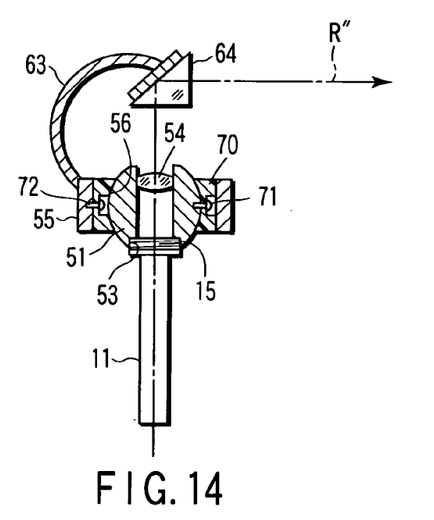
FIG. 14 is a partial vertical sectional view showing a medical apparatus according to a fourth embodiment of the invention.
Figure 15:
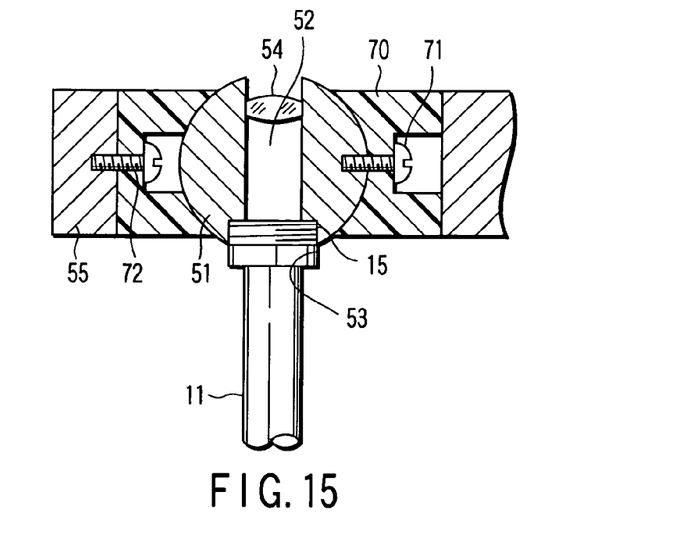
FIG. 15 is a vertical sectional view of an elastic connecting portion of the medical apparatus of the fourth embodiment.

A medical apparatus according to a fourth embodiment of the invention will now be described with reference to FIGS. 14 to 15. Like reference numerals are used to designate common portions of the third and fourth embodiments, and a detailed description of those portions is omitted.

In the present embodiment, the adapter 51 and the seat 55 are connected by means of an elastic member 70 that is formed of rubber or elastomer. The elastic member 70 constitutes coupling means that supports the adapter 51. It has an inner surface that is closely fitted on the spherical outer peripheral surface of the adapter 51. The elastic member 70 is fixed to the adapter 51 by means of a first screw 71. Its outer peripheral surface is closely fitted in the inner surface of the seat 55. The elastic member 70 is fixed to the seat 55 by means of a second screw 72.

In this embodiment, an elastic coupler includes the ring adaptor 51, the seat 55 and the elastic member 70 as member of an elastic coupling means.

Means for fixing the elastic member 70 to the adapter 51 or the seat 55 is not limited to the screwing means, and may alternatively be means that bonds them adhesively. Further, the adapter 51 and the seat 55 may be formed individually having catch portions for retention. In this case, the elastic member 70 is formed having retaining portions that can be removably attached to the catch portions so that the elastic member 70 can be detachably connected to the adapter 51 and the seat 55. This removable connecting means is suited for the replacement of the optical tube 11.

According to the present embodiment, the adapter 51 and the seat 55 are connected by means of the elastic member 70 that is located between them so as to cover the whole periphery of the adapter 51. Thus, a steady elastic supporting function can be obtained, and improvement of the connection strength can be expected. In the elastic coupling means of the present embodiment, a ring-shaped elastic member is utilized as a coupling unit, and besides, it can be used as a seal member for sealing an opening portion that is formed between the adapter 51 and the seat 55 on the housing side. The elastic connecting means that uses the elastic member of the present embodiment is also applicable to the elastic connecting means according to the first to third embodiments.

Figure 16:
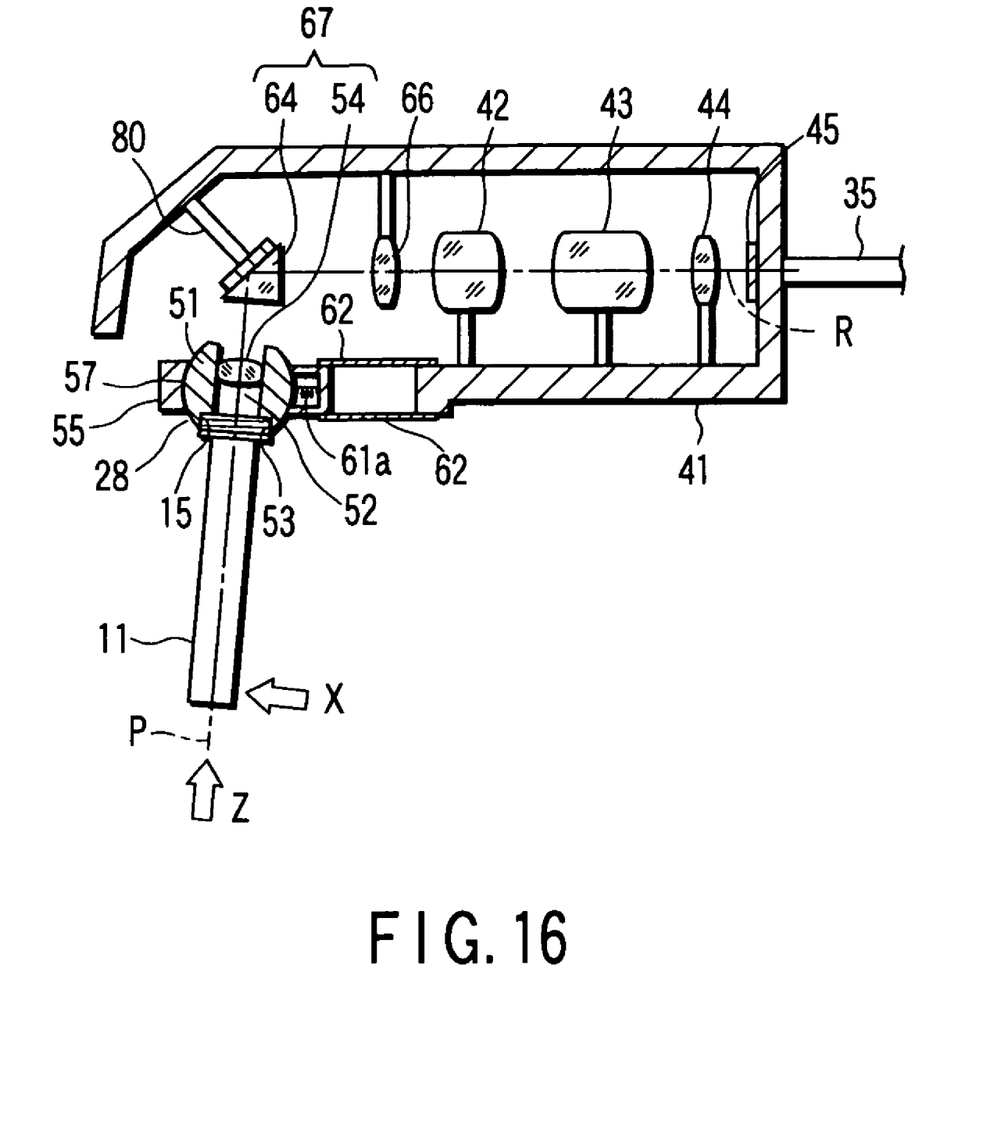
FIG. 16 is a partial vertical sectional view showing a medical apparatus according to a fifth embodiment of the invention.

A medical apparatus according to a fifth embodiment of the invention will now be described with reference to FIG. 16. Like reference numerals are used to designate common portions of the present embodiment and the foregoing embodiments, and a detailed description of those portions is omitted.

In the present embodiment, a prism 64 for use as a reflective member that reflects a luminous flux emitted from an objective lens to the image-pickup element is attached to a housing 41 as an image-pickup element holding unit. The prism 64 is attached to the inner wall of the housing 41 by means of a boom 80. Since the prism 64 is attached to the housing 41 according to the present embodiment, the lens holding unit can be made lighter in weight and in movement than in the case it is fitted with the objective lens.

Although the first and second housings are elastically connected for movement according to the foregoing embodiments, lock means may be used to prevent the movement of the two housings as required.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A medical apparatus comprising:
   an objective lens having an optical axis, onto which a luminous flux from a subject is incident;
   a lens holding unit which holds the objective lens;
   an image-pickup element which picks up an optical image formed by the objective lens, the image-pickup element having an image-pickup surface;
   an image-pickup element holding unit which holds the image-pickup element; and
   a coupling unit which connects the lens holding unit and the image-pickup element holding unit so that the position of the optical axis of the optical image is changed relative to the image-pickup surface of the image-pickup element.

2. A medical apparatus according to claim 1, wherein the coupling unit includes at least one elastic member deformable by external force acting on the lens holding unit.

3. A medical apparatus according to claim 1, wherein the coupling unit includes a plurality of coil springs arranged between the lens holding unit and the image-pickup element holding unit, the coil springs individually having tensile forces to pull the lens holding unit and the image-pickup element holding unit, the tensile forces being balanced to connect the lens holding unit and the image-pickup element holding unit.

4. A medical apparatus according to claim 1, wherein the coupling unit includes a plurality of bar-shaped elastic members located between the lens holding unit and the image-pickup element holding unit.

5. A medical apparatus according to claim 1, wherein the coupling unit includes a ring-shaped elastic member located in a gap formed between the lens holding unit and the image-pickup element holding unit.

6. A medical apparatus according to claim 1, which further comprises a guide device which regulates relative movement of the lens holding unit and the image-pickup element holding unit.

7. A medical apparatus according to claim 6, wherein the guide device includes an adapter, attached to one of the lens holding unit and the image-pickup element holding unit and having a substantially spherical outer peripheral surface, and a seat attached to the other holding unit and having an inner peripheral surface in a shape matching the substantially spherical outer peripheral surface of the adapter, the inner peripheral surface mating with the outer peripheral surface.

8. A medical apparatus according to claim 7, which further comprises a plurality of plate springs which connect the seat and the image-pickup element holding unit, are arranged substantially at right angles to the direction of the optical axis of the objective lens, and are deformed when subjected to external force in the direction of the optical axis of the objective lens, thereby moving the lens holding unit in the optical axis of the objective lens.

9. A medical apparatus according to claim 7, wherein the coupling unit includes at least one elastic member located near a region for the arrangement of the adapter and the seat.

10. A medical apparatus according to claim 1, which further comprises a relay optical system having an optical path which guides the luminous flux from the objective lens to the image-pickup element, the luminous flux passing through part of the optical path being afocal.

11. A medical apparatus according to claim 10, which further comprises a reflective member which reflects the luminous flux from the objective lens onto the image-pickup element, the reflective member being located on an optical path of the afocal luminous flux of the relay optical system.

12. A medical apparatus according to claim 10, wherein the coupling unit is located in a region corresponding to the optical path of the afocal luminous flux of the relay optical system.

13. A medical apparatus according to claim 1, which further comprises a reflective member which reflects the luminous flux from the objective lens onto the image-pickup element, the reflective member being held in the lens holding unit.

14. A medical apparatus according to claim 1, which further comprises a reflective member which reflects the luminous flux emitted from the objective lens onto the image-pickup element, the reflective member being held in the image-pickup element holding unit.

15. A medical apparatus according to claim 1, wherein the image-pickup element holding unit further comprises an imaging lens which forms an image of the luminous flux emitted from the objective lens on the image-pickup element.

16. A medical apparatus according to claim 1, wherein the lens holding unit includes an insertional section to be inserted into a body cavity.

17. A medical apparatus according to claim 1, wherein the image-pickup element holding unit includes a grip section to be held in a hand.

18. A medical apparatus comprising:
an objective lens onto which a luminous flux from a subject is incident;
an image forming means which forms an image based on the luminous flux incident on the objective lens;
an image-pickup means which picks up the image, the image-pickup means having an image-pickup surface;
a first supporting means which supports the objective lens;
a second supporting means which supports the image-pickup means; and
a coupling means which connects the first and second supporting means so that the objective lens and the image-pickup means are optically coupled to each other, the coupling means being elastically deformed so that the image moves on the image-pickup surface relatively in accordance with external force acting on the first supporting means.

19. A medical apparatus comprising:
an objective lens onto which a luminous flux from a subject is incident;
a lens holding frame which holds the objective lens;
an image-pickup element which picks up an optical image formed by the objective lens, the image-pickup element having an image-pickup surface;
an image-pickup element holding frame which holds the image-pickup element; and
a coupling unit which connects the lens holding frame and the image-pickup element holding frame so that the position of the optical image is changed relative to the image-pickup surface of the image-pickup element.

20. A medical apparatus comprising:
an objective lens onto which a luminous flux from a subject is incident;
an image forming lens which forms an image based on the luminous flux incident on the objective lens;
an image-pickup device which has an image-pickup surface to pick up the image;
a first housing which supports the objective lens;
a second housing which supports the image-pickup device so that the image-pickup device picks up the image; and
a coupler which connects the first and second housing so that the objective lens and the image-pickup device are optically coupled to each other, the coupler being elastically deformed so that the image moves on the image-pickup surface relatively in accordance with external force acting on the first housing.

* * * * *